(12) United States Patent
Streett et al.

(10) Patent No.: US 6,471,157 B1
(45) Date of Patent: Oct. 29, 2002

(54) DEVICE AND METHOD FOR REDUCING AIRCRAFT NOISE

(75) Inventors: Craig L. Streett, Yorktown, VA (US); John C. Lin, Yorktown, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/533,282

(22) Filed: Mar. 22, 2000

Related U.S. Application Data
(60) Provisional application No. 60/125,563, filed on Mar. 22, 1999.

(51) Int. Cl.[7] .............................................. B64C 21/10
(52) U.S. Cl. ........................ 244/1 N; 244/199; 244/130
(58) Field of Search ................................. 244/1 N, 211, 244/212, 213, 215, 217, 199, 204, 205, 200, 198, 130

(56) References Cited

U.S. PATENT DOCUMENTS

| | | | | |
|---|---|---|---|---|
| 2,896,880 A | * | 7/1959 | Vogler | 244/213 |
| 3,090,584 A | * | 5/1963 | Kuchemann et al. | 244/199 |
| 3,568,792 A | * | 3/1971 | Urquhart | 181/51 |
| 3,612,446 A | * | 10/1971 | Lebert | 244/1 N |
| 3,721,406 A | * | 3/1973 | Hurlbert | 244/213 |
| 3,776,363 A | * | 12/1973 | Kuethe | 244/1 N |
| 3,794,274 A | * | 2/1974 | Eknes | 244/1 N |
| 4,089,618 A | * | 5/1978 | Patel | 416/228 |
| 4,272,043 A | * | 6/1981 | Spillman | 244/199 |
| 4,318,699 A | * | 3/1982 | Wennerstrom | 415/119 |
| 4,466,586 A | * | 8/1984 | Burnham | 244/213 |
| 4,600,172 A | * | 7/1986 | Loth | 244/212 |
| 4,755,416 A | * | 7/1988 | Schneider et al. | 244/1 N |
| 5,074,376 A | * | 12/1991 | Powell | 181/277 |
| 5,088,665 A | * | 2/1992 | Vijgen et al. | 244/212 |
| 5,244,349 A | * | 9/1993 | Wang | 415/119 |
| 5,253,828 A | * | 10/1993 | Cox | 244/212 |
| 5,533,865 A | * | 7/1996 | Dassen et al. | 416/228 |
| 5,564,656 A | * | 10/1996 | Gilbert | 244/213 |
| 5,603,607 A | * | 2/1997 | Kondo et al. | 415/119 |
| 5,697,468 A | * | 12/1997 | Russel, Jr. et al. | 244/213 |
| 5,772,155 A | * | 6/1998 | Nowak | 244/213 |
| 6,027,305 A | * | 2/2000 | Ng et al. | 415/119 |
| 6,116,541 A | * | 9/2000 | Chuang et al. | 244/1 N |
| 6,123,296 A | * | 9/2000 | Mangalam | 244/213 |
| 6,168,383 B1 | * | 1/2001 | Shimizu | 416/228 |
| 6,179,562 B1 | * | 1/2001 | Funjinaka | 415/119 |

OTHER PUBLICATIONS

Arndt et al, Effect of leading edge serrations on noise radiation from a model rotor. AIAA Paper No. 72–655, 1972.*

* cited by examiner

Primary Examiner—Galen L. Barefoot
(74) Attorney, Agent, or Firm—Kurt G. Hammerle

(57) ABSTRACT

A noise abatement device that is positioned adjacent to a body. The noise abatement device generally includes tabs or cavities which thicken the shear layer created by fluid flow over, around, or near the body, by creating horseshoe-shaped vortices; this thickening of the shear layer reduces the strength of fluctuations in the flow which produce noise.

20 Claims, 3 Drawing Sheets

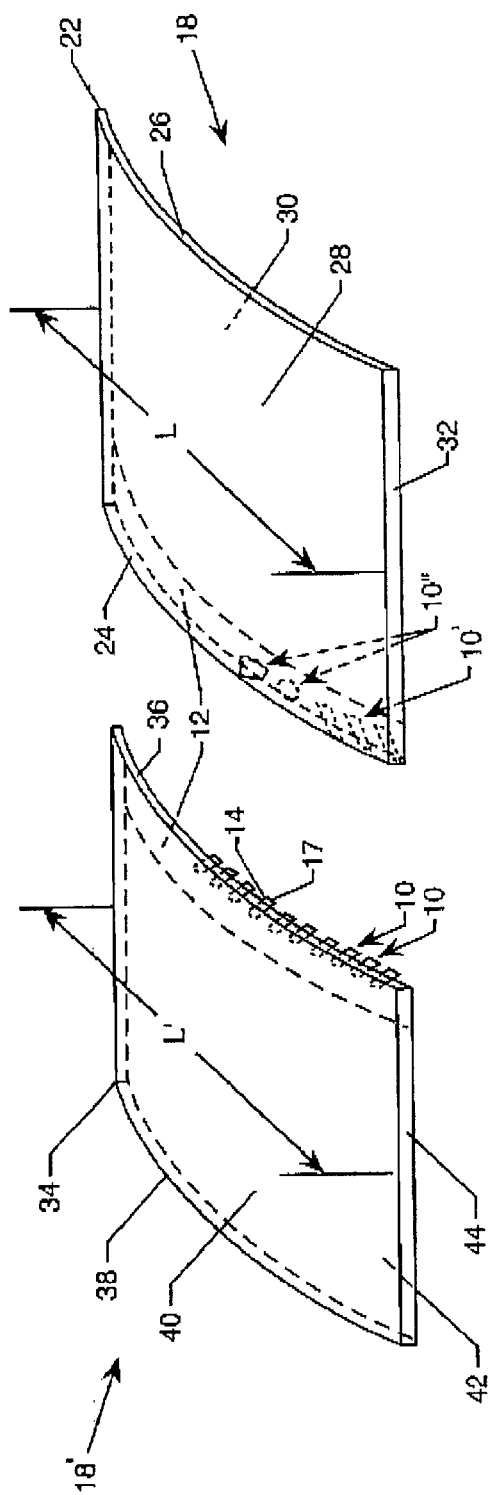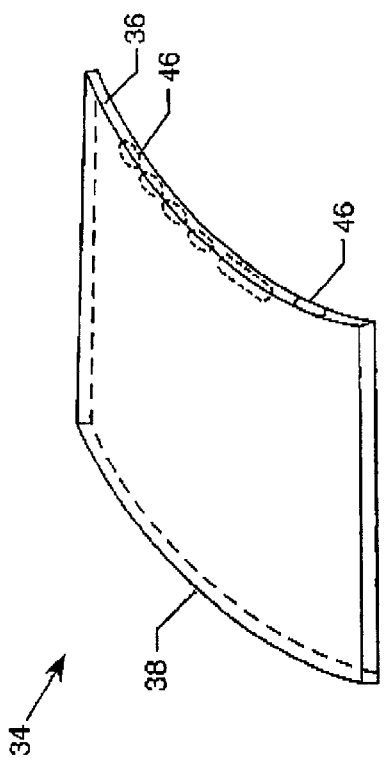
FIG. 4
FIG. 5

DEVICE AND METHOD FOR REDUCING AIRCRAFT NOISE

CROSS-REFERENCE TO RELATED APPLICATION

This application claims the benefit of earlier filed U.S. Provisional patent application Ser. No. 60/125,563, filed Mar. 22, 1999.

BACKGROUND OF THE INVENTION

1. Field of the Invention

The present invention generally relates to noise abatement and, more particularly, to a device for reducing noise caused by a fluid passing near a body.

2. Brief Description of the Prior Art

Fixed wing aircraft typically include engines, a fuselage, airfoils, and a tail section. Each airfoil is typically a solid section having a leading edge, a trailing edge, a first end, and a second end. A retractable flap, having a first flap end and a second flap end, is usually positioned adjacent the trailing edge of the airfoil, between the first end of the airfoil and the second end of the airfoil. When the flap is deployed, the flap provides additional lift to the airfoil.

Significant advancements have been made in making aircraft engines significantly quieter, primarily through the use of high-bypass-ratio engine technology. However, airframe noise remains a problem. Airframe noise is defined as sound from an aircraft induced solely by airflow not related to the engine during operation, which can rival that of the engine during aircraft landing. This noise poses a threat to the successful certification of subsonic aircraft.

As shown in FIG. 1, recent research using detailed experimental measurements and computations of an airflow field at first and second end portions A, B of a flap C indicates that vortices D are generated as a result of the lift of the flap C. These vortices are fed by a cylindrical shear layer E over most of the flap chord F, which is the streamwise length of the flap C. Numerical simulations indicate that this cylindrical shear layer E is highly unstable, resulting in strong flow field fluctuations adjacent the flap end portions A, B. These fluctuations have further been shown to create significant noise G in frequency ranges consistent with acoustic measurements of noise from the flap end regions. For full-scale subsonic transport aircraft, range is about 400 to 2500 Hz, while for model-scale measurements the typical frequency range is 5 to 30 kHz.

Currently, no known devices are being used to reduce the airframe noise generated at the end portions of the flap. A publication by A. S. Hersh et al. entitled "Investigation of Acoustic Effects of Leading-End Serrations on Airfoils", J. Aircraft, Vol. 11, No. 4, April 1974 (hereinafter referred to as "the Hersh publication") has shown that leading end serrations can reduce narrow-band tones radiated from stationary and rotating airfoils at low Reynolds numbers, but this is an entirely different application associated with a different noise-generation mechanism, i.e., the noise generation mechanisms in the Hersh publication are not caused by the cylindrical shear layer instability associated with the formation of vortices adjacent the flap end portions. In the Hersh publication, the serrations probably eliminate a leading edge separation bubble. Although the suspected noise-generation mechanism was discussed in subsequent publications, no method for eliminating the mechanism was proposed.

SUMMARY OF THE INVENTION

To help reduce the noise levels created by a body moving through a fluid, the present invention generally includes a method of abating noise caused by a shear layer created by fluid flow adjacent an end of the body. The primary step is thickening the shear layer adjacent to the end of the body. The shear layer is thickened by positioning protuberances adjacent the end of body or, alternatively, by slots formed by the end of the body. The protuberances thicken the shear layer by creating horseshoe-shaped vortices; by thickening the shear layer, the instability mechanism responsible for generating fluctuations and thus noise is weakened.

It is therefore an object of the present invention to reduce the noise created by a body passing through a fluid or, alternatively, the noise caused by a fluid traveling over, through, or around a body.

These and other advantages of the present invention will be clarified in the Brief Description of the Preferred Embodiments taken together with the attached drawings in which like reference numerals represent like elements throughout.

BRIEF DESCRIPTION OF THE DRAWINGS

FIG. 4 shows a plurality of protuberances shown in FIG. 2 positioned adjacent a first end of a flap and a first end of an airfoil; and FIG. 5 shows a second embodiment of the present invention.

DETAILED DESCRIPTION OF THE PREFERRED EMBODIMENTS

Figure 1:
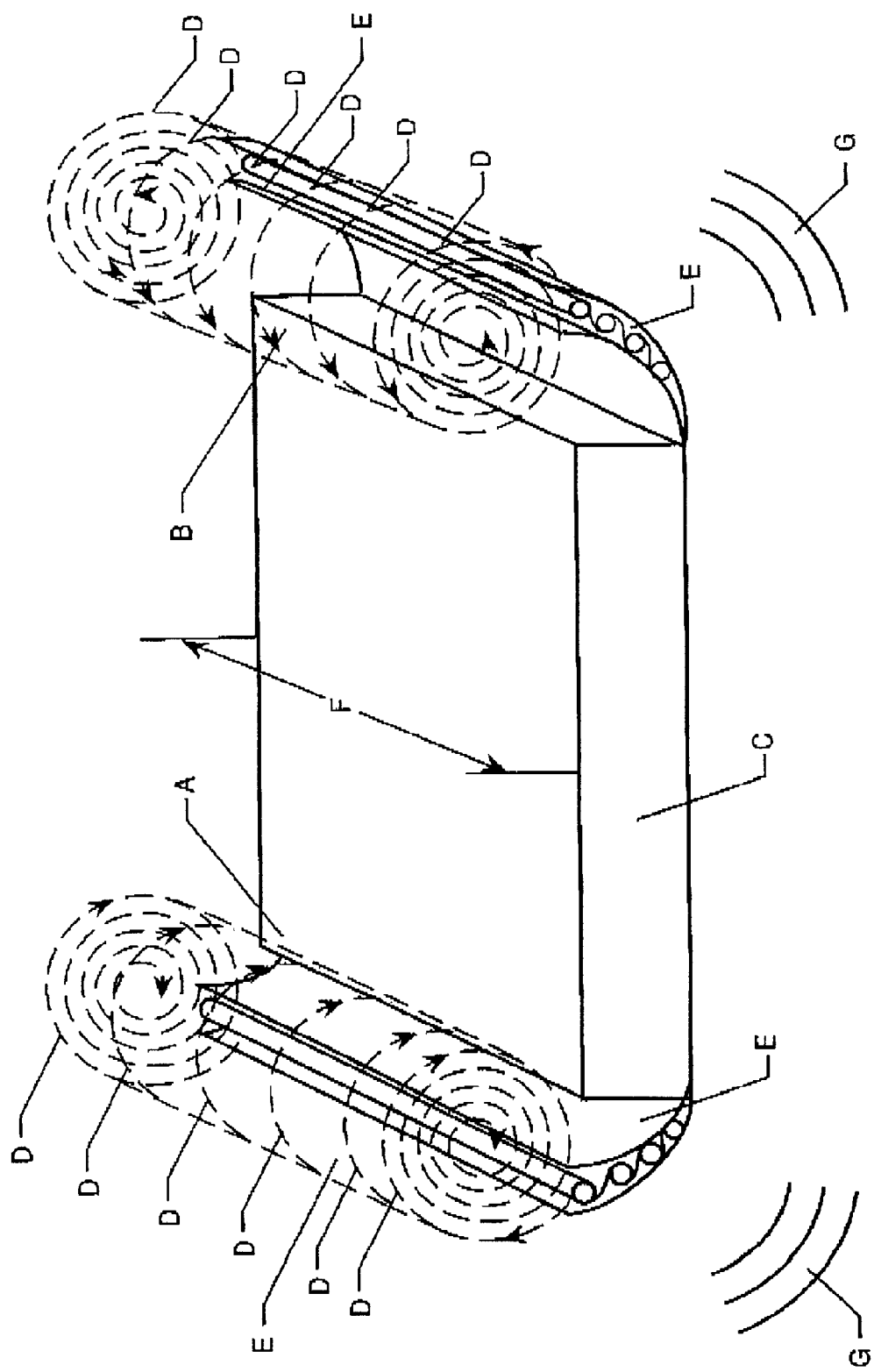
FIG. 1 is a perspective view of shear layers formed adjacent ends of a flap not configured with the present invention.
Figure 2:
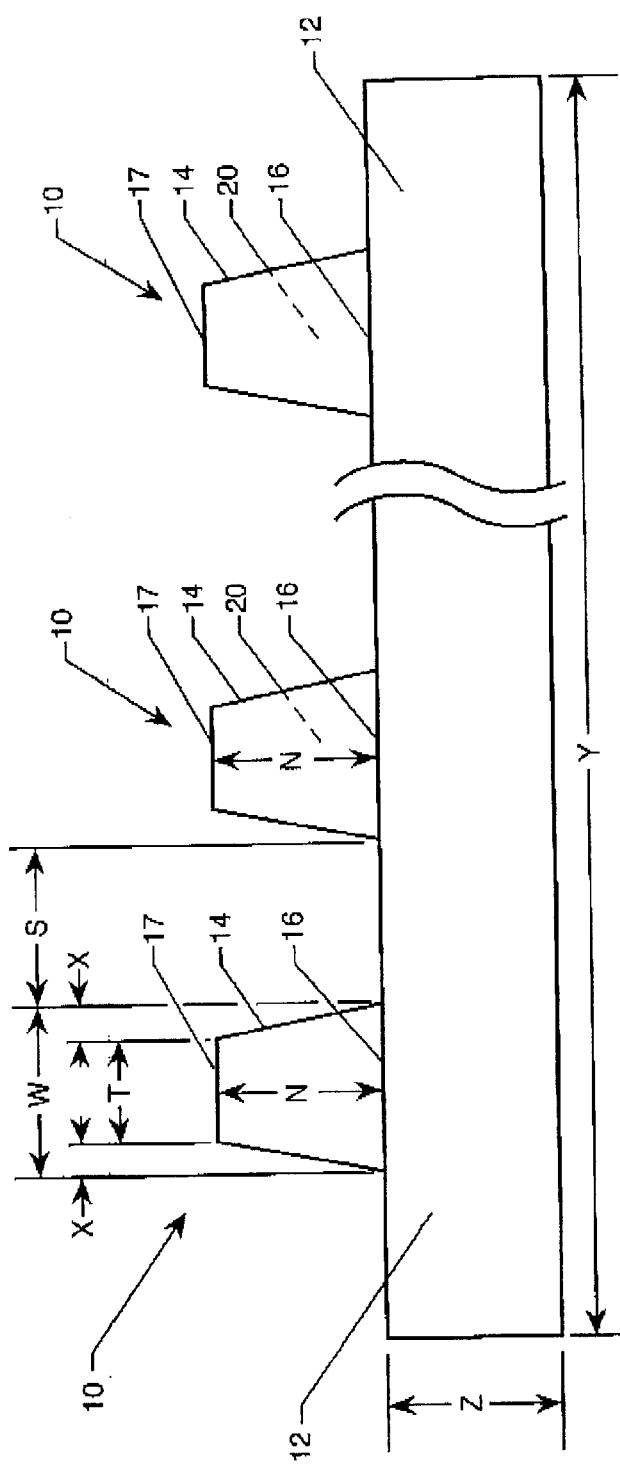
FIG. 2 is a top view of a plurality of protuberances according to one embodiment of the present invention.
Figure 3:
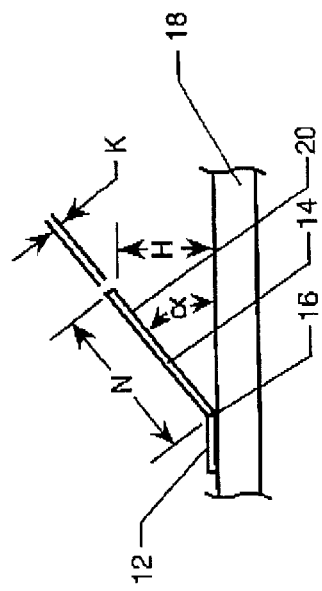
FIG. 3 is a side view of one of the protuberances shown in FIG. 2.

One embodiment of the present invention is generally shown in FIGS. 2–4. A second embodiment is shown in FIG. 5.

As shown in detail in FIG. 2, one embodiment of the present invention includes a shear layer thickening element, preferably spaced apart protuberances or tabs 10 having a length N, which thicken the shear layer created by fluid flow near an end of a body. The tab spacing S is the distance between protruding sides 14 of adjacent tabs 10 at their bases 16. A tab base width W of each tab 10 is the length of the tab 10 measured along its base 16. The preferred tab spacing S equals the tab base width W, which is equal to 1.63 times the tab height H (shown in FIG. 3) or 1.47 times a tab tip width T. The tab tip width T is the extent of the tab 10 measured at its tip 17, with the difference between the tip 17 width and the tab base width W shown by reference numerals X. The maximum effective tab spacing S is equal to about two times the tab base width W, which is equal to about 3.26 times the tab height H (shown in FIG. 3) or about 2.94 times tab tip width T. The minimum effective tab spacing S is approximately equal to 0.5 times the tab base width W, which is about 0.81 times the tab height H or about 0.73 times the tab tip width T. The following chart shows some exemplary tab dimensions, assuming a connector 12 length Y (discussed below) of 4 inches:

TABLE 1

Exemplary Dimensions of the First Embodiment

| TAB | W (in.) | S (in.) | T (in.) | N (in.) | X (in.) | Z (in.) | H (in.) | α (deg.) |
|---|---|---|---|---|---|---|---|---|
| 1 | 0.05 | 0.05 | 0.034 | 0.04 | 0.008 | 0.1 | 0.02 | 30 |
| 2 | 0.05 | 0.05 | 0.034 | 0.04 | 0.008 | 0.1 | 0.031 | 50 |
| 3 | 0.10 | 0.10 | 0.068 | 0.04 | 0.016 | 0.1 | 0.02 | 30 |
| 4 | 0.10 | 0.10 | 0.068 | 0.04 | 0.016 | 0.1 | 0.031 | 50 |

As shown in FIG. 3, the height H of each tab 10 is the distance that the tab 10 protrudes from the body 18. The tab inclination angle a is the angle formed between the body 18 and a first tab side 20 of each tab 10. A tab inclination angle of 90 degrees indicates that the tab 10 protrudes perpendicular with respect to the body 18. Preferably, each tab 10 forms a tab inclination angle a that is between 30 degrees and 50 degrees with respect to the body 18.

As shown generally in FIGS. 2 and 3, the tabs 10 may be supported by the connector 12 having a width Z and length Y. As an example, as shown in FIG. 4, the body 18 may be an airfoil 22 having a first airfoil end 24, a second airfoil end 26, a suction surface 28, a lift surface 30, a trailing edge 32, and an airflow chord L or the body 18 may be a retractable flap 34 positioned adjacent the trailing edge 32 of the airfoil 22, the flap 34 having a first flap end 36, a second flap end 38, a flap suction surface 40, a flap lift surface 42, and a flap chord L'. The tabs 10 are positioned on the lift surface 30 of the airfoil 22 between the first airfoil end 24 and the second airfoil end 26, parallel and adjacent to the first or second airfoil end 24, 26. Tabs 10 may also by positioned on the flap lift surface 42 of the flap 34, adjacent and parallel to the first or second flap end 36, 38.

Airfoils 22 and flaps 34 represent one possible application of the preferred embodiment of the present invention and each will be referred to throughout the remainder of the Detailed Description. However, the present invention is clearly applicable to any application having a body 18 moving through a fluid.

Each tab 10 is sized such that the tab height H is on the order of the thickness of the thin bottom boundary layer formed as air passes adjacent the flaps 34. The preferred tab height H is on the order of 0.5% to 1% of the length L, L' of the airfoil 22 or flap 34, with a minimum effective height of approximately 0.3% and a maximum effective height of approximately 2%. Stated another way, when the flap 34 is retracted for cruise, each tab 10 is well-embedded within a much thicker boundary layer adjacent the lift surfaces 30, 42 of the airfoil 22 and flap 34, thereby minimizing tab 10 induced drag. When the flap 34 is deployed, the local flow direction is changed such that the tabs 10 are automatically activated by the naturally-occurring, highly-skewed flow (as much as over 60 degrees with respect to the freestream) at a flap lift surface 42 of the flap 34. However, when the flap 34 is stowed in cruise, local flow adjacent the lift surface 30 of the airfoil 22 is parallel to the flap 34. This deactivates the tabs 10 since they are in a location and position with respect to the local flow direction that causes them to have no effect. As a result, tab 10 induced drag is negligible. To clarify still further, when the flap 34 is retracted for cruise, a frontal projection area (the area that the flow actually sees) is actually the side 14 of the tab 10. Therefore, tab 10 induced drag is a very small or negligible value, because the drag is approximately proportional to the thickness K of the tab 10 times the tab length N for only one single tab 10. For example, for a typical application on a flap 34 or airfoil 22, a tab thickness K of 0.02 inches and a tab length N of 0.3 inches results in a frontal projection area of only 0.006 square inches in cruise, a very small value.

The tabs 10 only need to be thick enough to maintain their shape, i.e., their inclination angle a. Typically, the tabs 10 can be made from suitable metallic materials, such as aluminum sheets on the order of 0.02 inches in thickness for application on full-scale airfoils 22 installed on aircraft. Aluminum is preferable on aircraft because aluminum sheet is light, inexpensive, commonly available, and easy to work with.

Although 0.004 inch stainless-steel was used for model-scale testing, increasing this thickness to 0.02 inches for full-scale applications may be too heavy and costly for use on actual aircraft. However, any material can be used that has sufficient stiffness to permit the tabs 10 to hold their angled positions during actual flight operations.

Wind tunnel tests have shown that the tabs 10 are effective in reducing the flap end noise associated with the shear layer instability in the model frequency range. Up to 4 dB flap end noise reduction was achieved in a test in the Quiet Flow Facility (QFF), and up to 7 dB noise reduction was achieved in a test in the LTPT at high Reynolds numbers, both on unswept research airfoil models. In a test in the 14×22 Subsonic Tunnel, up to 6 dB noise reduction was achieved on a swept-wing model, which was more representative of a subsonic-transport wing.

As shown in FIG. 4, tabs 10 can be placed along the flap lift surface 42 of the flap 34, adjacent the first or second flap ends 36, 38 of the flap 34. The tab tips 17 are positioned adjacent with or slightly inboard of the first flap end 36 or the second flap end 38 of the flap 34, parallel to the first flap end 36 or the second flap end 38. Depending on the specific flap end flowfield for a specific aircraft, the flap 34 (and airfoil 22) chord L, L' coverage of the tabs 10 usually starts at around 15–45% of the flap or airfoil chord L, L' and ends at a flap 34 trailing edge 44 (or airfoil trailing edge 32). The preferred flap or airfoil chord L, L' coverage of the tabs 10 is between 10% and 100% (i.e., maximum effective coverage) of the flap or airfoil chord L, L'. However, tests with chord L, L' coverage between 40% and 80% (i.e., minimum effective coverage) have shown noise reduction benefits.

FIG. 4 shows one or more rows of tabs 10 in the strip form mounted at the flap lift surface 42 of the flap 34, parallel to the first flap end 36. The tabs 10 can also be placed on the lift surface 30 of the airfoil 22, opposed to first flap end 36 of the flap 34 and/or in combination with the flap end installation.

Recent experiments at Langley's 14×22 Foot Subsonic Tunnel have shown that the most preferred spanwise location of tabs 10 is on the order of five device heights (5H) inboard of the first or second flap end 36, 38, (i.e., maximum effective inboard distance between the tab tips 17 and the first and second flap ends 36, 38). However, tests with tips 17 of the tabs 10 aligned with the first or second flap end 36, 38 have shown noise reduction benefit (i.e., minimum effective inboard distance between the tab tips 17 and first or second flap end 36, 38).

As shown in FIGS. 2 and 3, the tabs 10 are manufactured in an easily mounted strip form on a connector 12. They can be easily manufactured by cutting repeated trapezoidal-shaped notches on metal strips via wire electric discharge machining. However, any of a number of commonly available methods can be used to form the tabs 10, including, for example, stamping. Then, all protruded parts of the notched connector 12 or strip are bent upward to form an angle that is between 30 and 50 degrees, as shown in FIG. 3. Strips of tabs 10 are preferably attached to the flap 34 or airfoil 22 by suitable adhesives or other bonding materials. However, other conventional means of attachment may be used, such as welding or mechanical means, including rivets, bolts, screws, etc.

In an alternate embodiment, the tabs 10 could be made by direct machining or initial forming of the flap 34 or airfoil 22. In addition, although the simplest and preferred shaped of the tabs 10 are trapezoidal in shape, the tabs 10 can be any shape that can effectively generate horseshoe vortices for rapid mixing and thickening of the shear layer.

Although manufacturing is simplified by forming the tabs 10 from a strip of material, the tabs 10 do not need to have the same thickness as the strip or connector 12 from which they are formed or to which they are attached. For example, each tab 10 could be individually installed on the flap 34 or airfoil 22. Typically, the number of tabs 10 required ranges between twenty-five to forty on a flap 34, but the exact number will depend on the length of the flap 34 (flap chord L) and where the cylindrical shear layer is located. At least five tabs 10 are preferably required for noise reduction benefit. Note that the tab 10 spacing S is preferably directly proportional to the tab 10 height and need not stay constant. For example, if the tab 10 height increases toward the trailing edge 44, the tab 10 spacing can be proportionally increased as well.

As stated above, tabs 10 are but one way of achieving the thickening of the cylindrical shear layer that is necessary to reduce this noise component. Tests indicate that the single row of tabs 10 is most effective. Although, it is possible that multiple rows, in either aligned or staggered arrangement, could also result in achieving beneficial reductions in the noise component by thickening of the flap end 36, 38 cylindrical shear layer. Alternatively, any method for creating transverse or cross-stream mixing in the shear layer can have a favorable noise reduction effect similar to the use of protuberances, such as tabs 10. For instance, regular or irregular protuberances of any kind from the flap lift surface 42 near the flap ends 36, 38 could accomplish the same shear layer thickening, such as triangular tabs, semi-circular tabs, circular tabs, parallelogram tabs (including both rectangular and square tabs), cavities, spheres 10', hemi-spheres 10", cones, pyramids, cylinders, prism, or any other three-dimensional protuberances. In addition, as shown in FIG. 5, the shear layer may be thickened by blowing or blowing and suction, either steady or unsteady, from cavities, holes, or slots 46 near the flap ends 36, 38.

In summation, the tabs 10 of the present invention offer several advantages: (a) they come in the form of easily mounted strips or connector 12 that significantly reduce the manufacturing cost and the installation time, (b) they are a passive device which means that it is simple, economical, and easy to maintain, (c) they have negligible drag penalties because of their miniature size and low profile, (d) they do not alter the aerodynamics of the flap 34, virtually eliminating the need for additional performance and stability and control considerations during aircraft design, and (e) they are easily retrofitable to any new or existing aircraft. Each shear layer thickening element efficiently produces an array of trailing horseshoe vortices, causing flow to roll up quickly, resulting in very rapid mixing in the transverse or cross-stream direction and, thus, thickening and dispersing the shear layer. Based on theory that describes the instability process in a shear layer, a more dispersed layer with weaker shear (velocity gradient) produces weaker, lower frequency fluctuations. These fluctuations produce less noise both by the fact that they are weaker, but also by the fact that a thicker shear layer is more uniform since rapid distortion of the fluctuations as they travel in the shear layer is responsible for the actual noise production.

The invention has been described with reference to the preferred embodiment. Obvious modifications and alterations will occur to others upon reading and understanding the preceding Detailed Description. It is intended that the invention be construed as including all such modifications and alterations insofar as they come within the scope of the appended claims or the equivalents thereof

We claim:

1. A method of abating noise caused by a shear layer, the shear layer created by a fluid flow near an end of a body having a streamwise chord defined as being parallel to the fluid flow wherein the end of the body extends along a direction that is substantially parallel to the streamwise chord, the body further having a lift surface, said method comprising the step of:
   thickening the shear layer adjacent and along the end of the body by creating cross-stream mixing of the shear layer at positions on the lift surface along the end of the body.

2. The method of abating noise as claimed in claim 1 wherein the shear layer is thickened by protuberances at said positions.

3. The method of abating noise as claimed in claim 1 wherein the shear layer is thickened by cavities at said positions.

4. The method of abating noise as claimed in claim 2 wherein the protuberances are selected from the group of shapes consisting of trapezoidal, triangular, semi-circular, circular, parallelogram, prism, cylindrical, pyramidal, conical, hemispherical and spherical.

5. The method of abating noise as claimed in claim 1 wherein the body is an airfoil.

6. The method of abating noise as claimed in claim 1 wherein the body is a flap.

7. The method of abating noise as claimed in claim 2 wherein said protuberances are configured and disposed to form at least two rows, the at least two rows being at least one of:
   aligned with one another; and staggered one to another.

8. A noise abatement device comprising:
   a body having an end, a suction surface, a lift surface, and a streamwise chord defined as being parallel to a fluid flow passing over the body wherein the end extends along a direction that is substantially parallel to the streamwise chord; and
   a shear layer thickening element positioned at a plurality of positions on the lift surface adjacent and along the end of the body to create cross-stream mixing of the shear layer at said plurality of positions.

9. The noise abatement device as claimed in claim 8 wherein each shear layer thickening element is a tab.

10. The noise abatement device as claimed in claim 8 wherein each shear layer thickening element is a cavity.

11. The noise abatement device as claimed in claim 9 wherein each said tab has an inclination angle of between 30 degrees and 50 degrees, with respect to the lift surface of the body.

12. The noise abatement device as claimed in claim 9 wherein the spacing between adjacent tabs is approximately equal to the tab base width, 1.63 times the tab height, or 1.47 times the tab tip width.

13. The noise abatement device as claimed in claim 9 wherein a maximum spacing between adjacent tabs is approximately equal to 2 times the tab base width, 3.26 times tab height, or 2.94 times tab tip width.

14. The noise abatement device as claimed in claim 9 wherein a minimum spacing between adjacent tabs is approximately equal to 0.5 times the tab base width, 0.81 times the tab height, or 0.73 times the tab tip width.

15. The noise abatement device as claimed in claim 8 wherein the body is an airfoil.

16. The noise abatement device as claimed in claim 8 wherein the body is a flap.

17. The noise abatement device as claimed in claim 9 wherein said plurality of tabs are configured and disposed to form at least two rows, the at least two rows being at least one of:

aligned with one another; and staggered one to another.

18. A noise abatement device used to reduce airframe noise, comprising:

an airfoil having a streamwise chord, a first airfoil end and a second airfoil end opposing one another wherein each of the first airfoil end and second airfoil end extend along a direction that is substantially parallel to the streamwise chords a suction surface, a lift surface, and a trailing edge; and a retractable flap positioned adjacent the trailing edge of the airfoil, the flap having a first flap end lateral one of the first airfoil end and the second airfoil end, a second flap end, a flap suction surface, and a flap lift surface; and a plurality of tabs positioned on the lift surface of the airfoil between the first airfoil end and the second airfoil end, along, parallel and adjacent to the first flap end to create cross-stream mixing of the shear layer at said plurality of tabs.

19. The noise abatement device as claimed in claim 18 further comprising a plurality of tabs positioned on the flap lift surface of the flap, along and adjacent to the first flap end, and parallel to the plurality of tabs positioned on the lift surface of the airfoil.

20. The noise abatement device as claimed in claim 19 wherein the tabs form an inclination angle of between 30 degrees and 50 degrees, with respect to the respective airfoil lift surface and the flap lift surface.

* * * * *